US008462980B2

(12) United States Patent
Caballero et al.

(10) Patent No.: US 8,462,980 B2
(45) Date of Patent: Jun. 11, 2013

(54) SYSTEM AND METHOD FOR VIDEO DETECTION OF SMOKE AND FLAME

(75) Inventors: Rodrigo E. Caballero, Crystal Lake, IL (US); Hongcheng Wang, Vernon, CT (US); Ziyou Xiong, Wethersfield, CT (US); Pei-Yuan Peng, Ellington, CT (US); Alan Matthew Finn, Hebron, CT (US)

(73) Assignee: UTC Fire & Security, Farmington, CT (US)

( * ) Notice: Subject to any disclaimer, the term of this patent is extended or adjusted under 35 U.S.C. 154(b) by 400 days.

(21) Appl. No.: 12/736,748

(22) PCT Filed: May 8, 2008

(86) PCT No.: PCT/US2008/005965
§ 371 (c)(1),
(2), (4) Date: Nov. 5, 2010

(87) PCT Pub. No.: WO2009/136895
PCT Pub. Date: Nov. 12, 2009

(65) Prior Publication Data
US 2011/0064264 A1    Mar. 17, 2011

(51) Int. Cl.
*G06K 9/00* (2006.01)
*G06K 9/46* (2006.01)
(52) U.S. Cl.
USPC .......................................... 382/100; 382/195
(58) Field of Classification Search
USPC .................................................. 382/100, 195
See application file for complete search history.

(56) References Cited

U.S. PATENT DOCUMENTS

| | | | | |
|---|---|---|---|---|
| 4,614,968 A * | 9/1986 | Rattman et al. | ............... | 348/143 |
| 5,153,722 A * | 10/1992 | Goedeke et al. | ............... | 348/159 |
| 5,237,308 A * | 8/1993 | Nakamura | .................... | 340/588 |
| 5,510,772 A * | 4/1996 | Lasenby | ....................... | 340/578 |
| 5,671,159 A * | 9/1997 | Morita | .......................... | 702/130 |
| 6,844,818 B2 * | 1/2005 | Grech-Cini | ................... | 340/628 |
| 6,956,485 B1 * | 10/2005 | Aird et al. | ..................... | 340/577 |
| 7,155,029 B2 * | 12/2006 | King et al. | ..................... | 382/100 |
| 7,256,818 B2 * | 8/2007 | Sadok et al. | .................. | 348/143 |
| 7,286,704 B2 * | 10/2007 | Pfefferseder et al. | ......... | 382/181 |
| 7,495,573 B2 * | 2/2009 | Tice et al. | ..................... | 340/630 |
| 7,688,199 B2 * | 3/2010 | Zhang et al. | ............. | 340/539.26 |
| 7,769,204 B2 * | 8/2010 | Privalov | ....................... | 382/103 |

(Continued)

OTHER PUBLICATIONS

Official Search Report and Written Opinion in counterpart foreign Application No. PCT/US2008/005965, filed May 8, 2008.

*Primary Examiner* — Bhavesh Mehta
*Assistant Examiner* — Utpal Shah
(74) *Attorney, Agent, or Firm* — MH2 Technology Law Group LLP

(57) ABSTRACT

A video recognition system detects the presence of fire based on video data provided by one or more video detectors. The video recognition system divides each individual frame of video data into a plurality of frame elements and calculates with respect to each frame element a structural feature that the algorithm uses to identify a core region of potential fire. The video recognition system defines a region surrounding the core region and calculates with respect to each frame element within the surrounding region a temporal feature. Based on the calculated temporal feature, the video recognition system associates a representative temporal value with the core region. Based on the structural and temporal features associated with the core region, video recognition system determines whether the video data indicates the presence of fire.

20 Claims, 3 Drawing Sheets

U.S. PATENT DOCUMENTS 7,805,002 B2 * 9/2010 Privalov .................. 382/170
2003/0215141 A1 11/2003 Zakrzewski et al.
2005/0012626 A1 1/2005 Owrutsky et al.
2007/0188336 A1 * 8/2007 Privalov .................. 340/628

* cited by examiner

SYSTEM AND METHOD FOR VIDEO DETECTION OF SMOKE AND FLAME

BACKGROUND

The present invention relates generally to computer vision and pattern recognition, and in particular to video analysis for detecting the presence of fire.

The ability to detect the presence of fire provides for the safety of occupants and property. In particular, because of the rapid expansion rate of a fire, it is important to detect the presence of a fire as early as possible. Traditional means of detecting fire include particle sampling (i.e., smoke detectors) and temperature sensors. While accurate, these methods include a number of drawbacks. For instance, traditional particle or smoke detectors require smoke to physically reach a sensor. In some applications, the location of the fire or the presence of heating, ventilation, and air conditioning (HVAC) systems prevents smoke from reaching the detector for an extended length of time, allowing the fire time to spread. A typical temperature sensor requires the sensor to be located physically close to the fire, because the temperature sensor will not sense a fire until a sufficient amount of the heat that the fire produces has spread to the location of the temperature sensor. In addition, neither of these systems provides as much data as might be desired regarding size, location, or intensity of the fire.

Video detection of a fire provides solutions to some of these problems. A number of video content analysis algorithms for detecting flame (as indicative of fire) are known in the prior art. For example, some algorithms analyze video data to detect color characteristics (e.g., red, orange) associated with flame. These algorithms may also analyze the video data for flicker characteristics indicative of flame. However, positively indicating the presence of a fire typically requires some overlap between regions in the image illustrating both characteristics of flame. In addition, while these methods detect the presence of flame, they do not detect the presence of smoke.

SUMMARY

A method of detecting fire using video analysis includes acquiring video data comprised of individual frames and dividing the individual frames into a plurality of frame elements. The method further includes calculating a structural feature associated with each frame element, the structural feature being used to identify frame elements associated with a core region of potential fire. Based on the identified core region, the method defines a region surrounding the core region and calculates with respect to each frame element within the surrounding region a temporal feature. The temporal feature is then associated with the core region. Decisions regarding the presence of fire are based on the combination of structural and temporal features associated with the core region.

In another aspect, a video recognition system detects the presence based on video data received from one or more video detectors. The video recognition system includes frame buffer, a frame element divider, a core region identifier, a surrounding region identifier, a temporal feature calculator, a temporal feature assignor, and decisional logic. The frame buffer stores one or more frames of video data. A frame element divider divides each of the individual frames into a plurality of frame elements. A core region identifier calculates with respect to each frame element a structural feature that is used to identify a core region of potential fire. Based on the identified core region, a surrounding region identifier defines a region surrounding the core region. A temporal feature calculator calculates with respect to each frame element within the surrounding region a temporal feature. Based on the calculated temporal features, an assignor associates a representative temporal feature calculated with respect to the surrounding region to the core region. Decisional logic then determiners based on the structural and temporal features associated with the core region whether the video data indicates the presence of fire and generates an output based on this determination.

DETAILED DESCRIPTION

Prior art methods of detecting fire based on video data employ video analysis that searches for "visual signatures" indicating fire. These visual signatures may include color, motion, and geometry of the fire region. Typically, prior art methods analyze each pixel within a frame for visual signatures, and based on values extracted with respect to each pixel determines whether or not the pixel is a fire pixel. For instance, the presence of flame may be determined based on the motion or flicker of each pixel, as well as a value associated with the color of each, pixel. Those pixels identified as having a flicker value characteristic of flame (e.g., flickering within a defined frequency range) and a color value characteristic of flame (e.g., red, yellow) are identified as flame pixels. Employing both flicker and color characteristics reduces the likelihood of false alarms. Thus, a man in a red coat identified based on color as indicative of flame will not result in an alarm being sounded because none of the pixels will exhibit the proper flickering, characteristic.

However, such prior art methods only identify pixels as containing flame if there is overlap between pixels identified by the characteristic flicker value and pixels identified by the characteristic color value. While preventing false alarms, this method may result in a sparse detection of elements corresponding to areas of flame within the frame, making determination of the size, location or source of the fire less accurate. In addition, such prior art methods typically only detect the presence of flames, not smoke.

The present invention seeks to take advantage of knowledge regarding the nature of fire, including the nature of both flame and smoke. In particular, the turbulent nature of both flame and smoke is often most detectable around the periphery of the core region of smoke or flame. Thus, the present invention employs structural features (e.g., segmentation of a candidate smoke region based on color information) to detect a core region indicative of flame and/or smoke. A region surrounding the core region is defined based on the detected core region, and temporal features are extracted with respect to each frame element within the surrounding region. Unlike prior art methods that require overlap between features such as flicker and/or color, the present invention assigns the temporal values detected in the surrounding region to the core region. In this way, the turbulent nature of fire (as extracted by temporal features such as flicker) often found on the periphery of a fire is associated with core regions of a fire (as extracted by structural features such as the color) to provide for improved identification of all regions characterized by flame and smoke.

Throughout this description, the term fire is used broadly to describe the presence of flame and/or smoke. Where appropriate, specific embodiments are provided that describe the detection of either flame or smoke.

Figure 1:
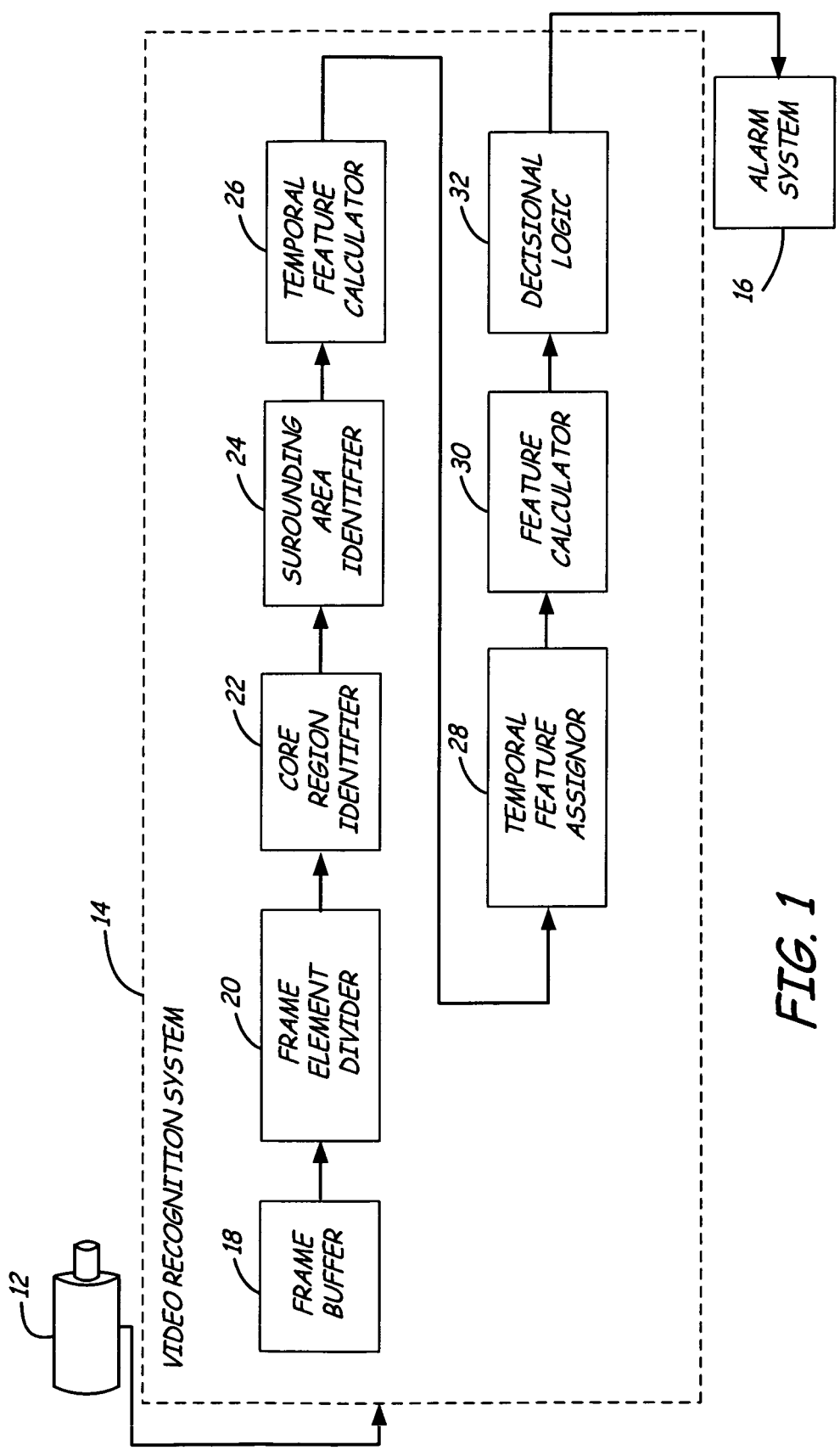
FIG. 1 is a functional block diagram of a video detector and video recognition system of the present invention.

FIG. 1 is a functional block diagram of fire detection system 10, which includes at least one video detector 12, video recognition system 14 and alarm system 16. Video images captured by video detector 12 are provided to video recognition system 14. The provision of video by video detector 12 to video recognition system 14 may be by any of a number of means, e.g., by a hardwired connection, over a dedicated wireless network, over a shared wireless network, etc.

Video detector 12 may be a video camera or other image data capture device. The term video input is used generally to refer to video data representing two or three spatial dimensions as well as successive frames defining a time dimension. In an exemplary embodiment, video input is defined as video input within the visible spectrum of light. However, the video detector 12 may be broadly or narrowly responsive to radiation in the visible spectrum, the infrared spectrum, the ultraviolet spectrum, or combinations of these broad or narrow spectral frequencies. The video input is analyzed by computer methods to identify a core region of flame and/or smoke. Based on the identification of the core region, a surrounding area is identified as a surrounding region. The surrounding region is analyzed using computer methods to generate values representing the detected flicker. The maximum flicker detected within the surrounding region is associated with the core region. Based on the assigned flicker and other metrics computed with respect to the core region, a classifier determines whether fire is present in a particular area.

Figure 2:
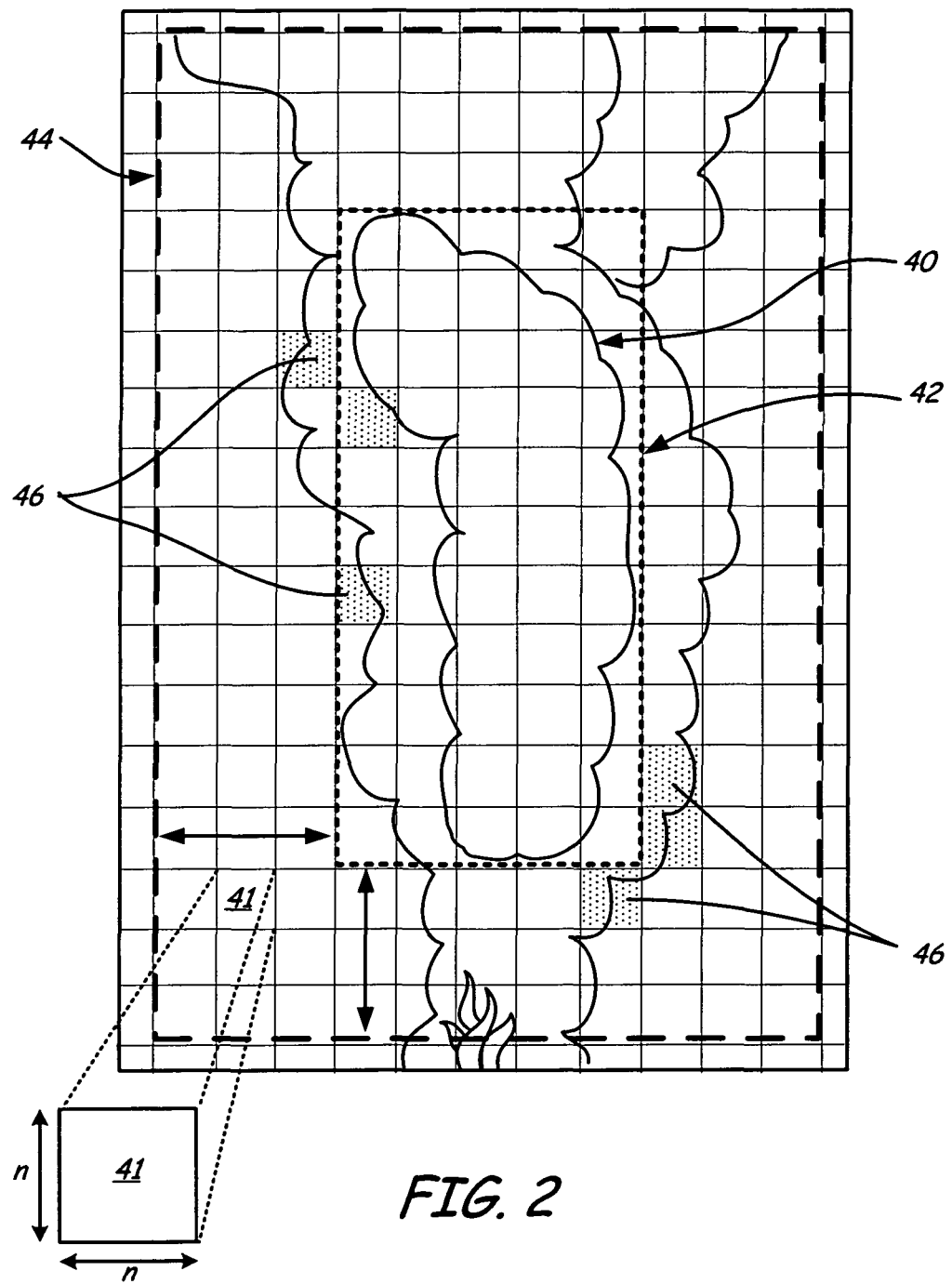
FIG. 2 is an exemplary embodiment of a sample frame of video data analyzed by the video recognition system of the present invention.

FIG. 2 illustrates an exemplary embodiment of a sample frame analyzed using video recognition system 14. The example shown in FIG. 2 will be referenced throughout to aid in the description of the functions performed by video recognition system 14.

Video recognition system 14 includes frame buffer 18, frame element divider 20, core region identifier 22, surrounding region identifier 24, temporal feature calculator 26, temporal feature assignor 28, feature calculator 30, and decisional logic 32.

Video detector 12 captures a number of successive video images or frames. Video input from video detector 12 is provided to video recognition system 14. In particular, frame buffer 18 temporarily stores a number of individual frames. Frame buffer 18 may retain one frame, every successive frame, a subsampling of successive frames, or may only store a certain number of successive frames for periodic analysis. Frame buffer 18 may be implemented by any of a number of means including separate hardware or as a designated part of computer memory.

Frame divider 20 divides each frame into a plurality of frame elements. The size and shape of the frame elements may vary, such that a frame element may be defined by individual pixels, by blocks in which each frame is divided into a plurality of blocks, or by blobs in which each frame is divided into one or more blobs as commonly employed in video analytics. Frame elements consisting of individual pixels represent the most basic level of computation, in which decisions are made at the pixel level. For block-wise processing, each frame is divided into a number of blocks, each block being defined by a certain number of pixels (e.g., a square consisting of eight pixels by eight pixels, a rectangle, or other applicable polygons). Analysis is then performed at the block level. In the example shown in FIG. 2, the frame is divided into a plurality of blocks (a sample block is labeled 41), each block consisting of n by n pixels.

Core region identifier 22 analyzes each frame element (whether individual pixels, blocks, or blobs) and identifies core regions of fire, including core regions of flame and/or smoke. A variety of techniques may be employed to detect core regions of flame or smoke, and the process for detecting core regions of flame may differ from processes used to detect core regions of smoke. In particular, core region identifier calculates a number of non-temporal, or structural features that are used to identify regions that potentially indicate the presence of fire. For example, to detect the core region associated with a flame, core region identifier 22 may calculate Hue, Value and Saturation values (in HSV color space) associated with each frame element in an effort to detect bright regions with red-yellow hues indicative of flame. Based on the calculated HSV values, core region identifier 22 calculates a likelihood or confidence level associated with each frame element being a part of a flame core region. In other embodiments, features such as a color feature, a color intensity feature, a geometric feature (e.g., perimeter, area, volume, etc.), a morphological feature (e.g., dilation, convolution, or filtering), a textural feature (dynamic or static texture), or a combination of these features may be used alone or in combination within one another to determine whether a frame element should be included as part of the flame core region. In embodiments in which morphological operations are employed, then the frame elements are defined as blobs and the core region is defined as one such blob.

Figure 3:
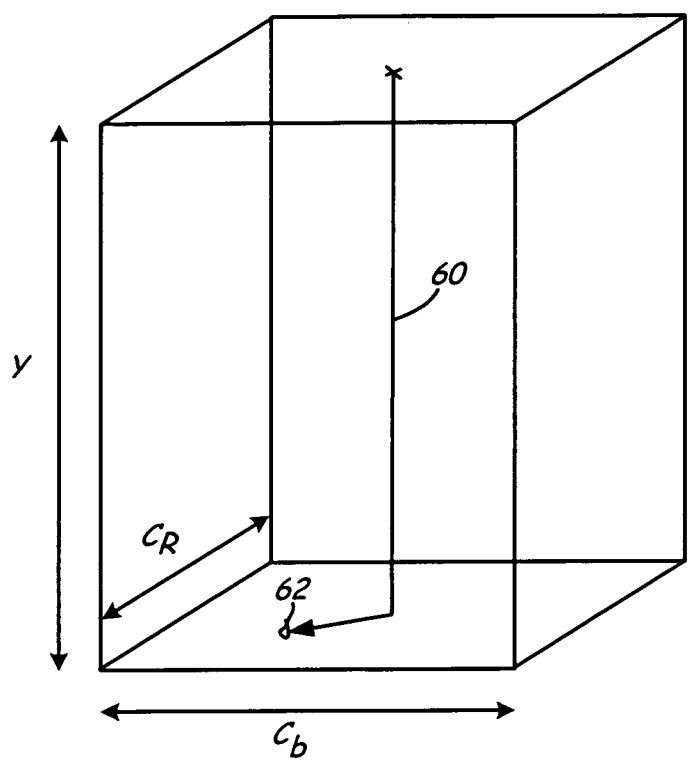
FIG. 3 is graph of a three-dimensional color space employed by the video recognition system of the present invention to detect loss of color.

To detect core regions of smoke, core region identifier 22 may employ different structural features such as loss of color with respect to a background. In an exemplary embodiment, each frame element is analyzed and projected onto a three-dimensional color space YCbCr, illustrated in FIG. 3 (wherein Y represents luma, Cb represents a blue chroma component, and Cr represents a red chroma component). The center of the CbCr plane (labeled 60) represents shades of grey from black (represented at the bottom of the color space) to white (represented at the top of the color space). The color content associated with a particular frame element is determined by measuring the distance between line 60 representing the center of the CbCr plane and the projection of the frame element (in this example, labeled 62) onto this color space. Color loss is then determined by comparing the difference between the color content in the current frame element from the color content of the corresponding frame element in a frame representing the background (e.g., a previously stored frame). Thus, as smoke obscures and decreases the color content associated with a particular frame element, core region identifier 22 detects this loss of color and based on a threshold value determines a likelihood or confidence level with each frame element being a part of the core region representing smoke. In another exemplary embodiment, a core region of smoke may be determined based on loss of edge content for images that have dense background edge content. In this embodiment, edge data measured with respect to frame elements in a current frame are compared with edge data measured and stored with respect to the same frame elements to detect a decrease of edge data. As discussed above with respect to detecting core regions of flame, core region identifier 22 may make use of a variety of other features to detect the presence of smoke, including well-known geometric features, textural features, morphological features, or a combination thereof to detect and define a core region of smoke. Once again, if morphological operations are employed then the core is defined as blob region.

In the example shown in FIG. 2, structural features such as loss of color are used to identify a plurality of frame elements (referred to generally as core region 40) as forming a core region of smoke.

Based on the identification of the core region (either flame core, smoke core, or a combination of both), region identifier 24 defines the location of the region surrounding the core region. In an exemplary embodiment, the surrounding region is defined simply as a number of frame elements surrounding the identified core region. In another exemplary embodiment, a bounding box is defined around the core region, and is defined such that all frame elements identified by structural features as included in the core region are included within the bounding box (for example, see bounding box 42 shown in FIG. 2). However, the bounding box may also include some frame elements not classified as within the core region. In this embodiment, the algorithm defines the location of the surrounding region as a number of frame elements surrounding the bounding box. In the example shown in FIG. 2, surrounding region 44 is defined as extending three frame elements outside of bounding box 42. In other embodiments, region identifier 24 defines the surrounding region based on geometric properties (e.g., perimeter, area, etc.) of the identified core region, such that the size of surrounding region is based on geometric properties of the core region. This may include defining a ratio that determines the scales the size of the surrounding region relative to the size of the core region.

In another exemplary embodiment in which morphological operations such as dilation and erosion are used to detect the core region, then the difference between the erosion and the dilation of the core blob is used to define the surrounding region. For example, the surrounding region may be defined as some multiple of the erosion and dilation of the core blob.

Based on the identification of the surrounding region, temporal feature calculator 26 calculates a temporal value (e.g., flicker value) for each frame element within the surrounding region. The temporal value is based on successive frames of data, and identifies turbulent motion indicative of flame and smoke. In general, it refers to the temporal periodicity of intensity associated with an individual pixel, block, or blob. Experimental results indicate that flame illustrates a characteristic flicker at frequencies up to approximately fifteen hertz (Hz). Experimental results also indicate that smoke has a characteristic flicker at frequencies up to approximately three Hz. Temporal feature calculator 26 may make use any of a variety of methods of calculating flicker values associated with each frame element within the surrounding region, including Discrete Fourier Transform (DFT), Fast Fourier Transform (FFT), Wavelet Transform, Mean Crossing Rate (MCR), or incremental DFT, etc. The Discrete Sine and Cosine transforms may also be used in place of the more general Fourier Transform. For example, the DFT is applied to each frame element and the resulting magnitude of the normalized DFT coefficients existing within the known range of flame flicker (e.g., 3-15 Hz) becomes the flicker value for that particular frame element. In another exemplary embodiment employing the MCR, flicker feature calculator 26 calculates the mean crossing rate over N frames of the signal using the following equation:

$$MCR = \frac{1}{2}\sum_{m=1}^{N-1} |\text{sgn}[x(m+1)] - \text{sgn}[x(m)]| \quad (1)$$

wherein $$\text{sgn}[x(m)] = \begin{cases} 1 & x(m) > \text{mean}(x) \\ -1 & \text{otherwise} \end{cases}$$

In the example shown in FIG. 2, the algorithm has identified a number of frame elements (labeled generally, frame elements 46) having flicker characteristics indicative of smoke based on the calculated flicker values. As shown in FIG. 2, some frame elements with flicker characteristics indicative of smoke are located within the surrounding region, while others fall within the bounding box of the core region. In other examples, one or more of the frame elements within the core region may be identified as having flicker values indicative of smoke or flame. However, as shown in FIG. 2, it is possible that a number of frame elements identified as part of the core region will not overlap with frame elements identified by temporal features as indicative of smoke or flame. In prior art methods that rely on overlap between features associated with color and features associated with flicker to positively identify the presence of flame, no frame elements in this example would be identified as containing either flame or smoke.

Based on the temporal features calculated with respect to the surrounding region, temporal feature assignor 28 assigns a representative temporal value to the core region. In situations in which the temporal value is indicative of smoke, then the core region is assigned a temporal value identifying it as indicative of smoke. In situations in which the temporal value is indicative of flame, then the core region is assigned a temporal value identifying it as indicative of flame. In both situations, the turbulent nature of smoke and flame detected in the surrounding region is associated with the core region.

In an exemplary embodiment, the algorithm assigns to all frame elements within the core region the temporal value associated with the frame element within the surrounding region having the highest value (e.g., the value most indicative of the presence of flame or smoke). In other exemplary embodiments, the algorithm calculates other statistical values or distributions, e.g., average, median or mode of the temporal values detected within the surrounding region, and assigns the statistical value(s) to all frame elements within the core region. In addition, frame elements not within the core region are assigned a temporal value of zero. In this way, the turbulent nature of flame and smoke that is often most prevalent on the outer periphery of a core region of smoke or flame is associated with frame elements in the core region. Thus, the present invention provides a combination of structural features (e.g., color) and temporal features (e.g., flicker) for each frame element within the core region to provide a combination of features that improves the overall detection of both flame and smoke.

In the embodiment shown in FIG. 1, feature calculator 30 calculates additional features associated with each frame element. In an exemplary embodiment, additional features are extracted only with respect to frame elements within the core region, while in other embodiments additional features are extracted with respect to frame elements within the surrounding region as well. For example, additional features calculated with respect to the frame elements include, but are not limited to, color intensity, obscuration, motion-based detection, etc. In other embodiments, determinations made regarding the presence of fire are made based solely on the structural and temporal features described above.

Decisional logic 32 determines based on the input, including the structural information (e.g., frame elements associated with the core region and associated structural features) and temporal information assigned to the core region (e.g., flicker value associated with all frame elements in the core region), whether the core region contains flame or smoke. In an exemplary embodiment, the algorithm may also make use of additional features calculated with respect to the video data. A variety of methods or algorithms may be employed to make the determination. For example, decisional logic 32 may be implemented as a neural network, a logical rule-based system, or a support vector-based system. For instance, a neural network may be comprised of a non-linear statistical data modeling or decision making tools. The network can be designed to model complex relationships between sets of data. In this way, the neural network can identify patterns in the analyzed video data based on the identified core region and associated temporal value assigned to the core region.

Video recognition system 14 generates an output that is provided to alarm system 16. The output may include a binary representation of whether the presence of fire has been detected within the video data. In an exemplary embodiment, the output may also include data indicative of the size and location of the fire. The output may also include the video data received from the video detector and features calculated with respect to the video detector.

Alarm system 16 receives the output provided by video recognition system 14. In an exemplary embodiment, alarm system 16 may include traditional fire alarms, including audio and visual alarms indicating to occupants and local fire-fighters the presence of a fire. In other exemplary embodiments, alarm system 16 may include a user interface in which the detected presence of a fire alerts a human operator. In response, the human operator may review video data provided by video recognition system 14 to determine whether a fire alarm should be sounded.

In the embodiment shown in FIG. 1, the components illustrated as part of video recognition system 14 may be embodied in the form of computer or controller implemented processes and apparatuses for practicing those processes. For instance, a computer comprised of a processor and storage device (e.g., hard disk, random access memory, etc.) are operable to implement a software application that implements the components illustrated with respect to FIG. 1. The present invention can also be embodied in the form of computer program code containing instructions embodied in a computer readable medium, such as floppy diskettes, CD-ROMs, hard drives, or any other computer-readable storage medium, wherein, when the computer program code is loaded into and executed by a processor employed in video recognition system 14, the video recognition system becomes an apparatus for practicing the invention. The present invention may also be embodied in the form of computer program code as a data signal, for example, whether stored in a storage medium, loaded into and/or executed by a computer or video recognition system 14, or transmitted over some transmission medium, such as over electrical wiring or cabling, through fiber optics, or via electromagnetic radiation, wherein, when the computer program code is loaded into and executed by a computer or video recognition system, the computer or video recognition system 14 becomes an apparatus for practicing the invention. When implemented on a general-purpose microprocessor, the computer program code segments configure the microprocessor to create specific logic circuits.

For example, in an embodiment shown in FIG. 1, memory included within video recognition system 14 may store program code or instructions for implementing the components shown in FIG. 1. The computer program code is communicated to a processor included within video recognition system 14, which executes the program code to implement the functionality described with respect to the present invention.

Although the present invention has been described with reference to preferred embodiments, workers skilled in the art will recognize that changes may be made in form and detail without departing from the spirit and scope of the invention. For example, although a video recognition system including a processor and memory was described for implementing the function described with respect to FIG. 1, any number of suitable combinations of hardware and software may be employed for executing the mathematical functions employed by the video recognition system.

Furthermore, throughout the specification and claims, the use of the term 'a' should not be interpreted to mean "only one", but rather should be interpreted broadly as meaning "one or more". The use of the term "or" should be interpreted as being inclusive unless otherwise stated.

The invention claimed is:

1. A method of detecting fire using video analysis, the method comprising:
    acquiring video data comprised of individual frames;
    dividing each of the individual frames into a plurality of frame elements;
    calculating a structural feature associated with each frame element;
    identifying a core region of fire based on the calculated structural features;
    defining a region surrounding the core region;
    calculating a temporal feature associated with each frame element within the surrounding region;
    associating the temporal features calculated with respect to frame elements within the surrounding region with the identified core region by assigning a representative temporal feature value to the core region; and
    generating an output indicating whether the analyzed video data indicates the presence of fire based, at least in part, on the structural features and assigned temporal features associated with the identified core region.

2. The method of claim 1, wherein identifying a core region of fire includes:
    identifying a core region of flame based on one or more of the following structural features associated with each frame element: a color feature, a color intensity feature, a geometric feature, texture feature, and a morphological feature.

3. The method of claim 1, wherein identifying a core region of fire includes:
    identifying a core region of smoke based on one or more of the following structural features associated with each frame element: a color feature, an edge data feature, a geometric feature, a texture feature, and a morphological feature.

4. The method of claim 1, wherein the surrounding region is defined as including the core region and a defined number of frame elements surrounding a periphery of the core region.

5. The method of claim 1, wherein the surrounding region is defined based on geometric properties of the identified core region.

6. The method of claim 1, wherein defining the surrounding region includes:
    defining a bounding box that includes all frame elements identified as part of the core region; and
    defining the surrounding region as including the bounding box and a number of frame elements surrounding a periphery of the bounding box.

7. The method of claim 1, wherein associating temporal features calculated with respect to frame elements within the surrounding region with the identified core region includes:
associating a temporal feature associated with flame to the identified core region.

8. The method of claim 1, wherein associating temporal features calculated with respect to frame elements within the surrounding region with the identified core region includes:
associating a temporal feature associated with smoke to the identified core region.

9. The method of claim 1, wherein associating the temporal features calculated with respect to frame elements within the surrounding region with the identified core region includes:
assigning a maximum temporal feature calculated with respect to the frame elements in the surrounding region to all frame elements within the core region.

10. The method of claim 1, wherein associating the temporal features calculated with respect to frame elements within the surrounding region with the identified core region includes:
calculating an average flicker value based on the flicker values generated with respect to each of the frame elements in the surrounding region; and
assigning the average flicker value to all frame elements within the core region.

11. A system for detecting the presence of fire, the system comprising:
a frame operably connectable to receive video data comprised of a plurality of individual frames and to store the received video data;
a frame element divider that divides each of the individual frames into a plurality of frame elements;
a core region identifier that calculates with respect to each frame element a structural feature that is used to identify a core region of potential fire;
a surrounding region identifier that defines a region surrounding the core region;
a temporal feature calculator that calculates with respect to each frame element within the surrounding region a temporal feature;
an assignor that associates a representative temporal feature calculated with respect to the surrounding region to the core region; and
decisional logic that determines based on the structural and temporal features associated with the core region whether the video data indicates the presence of fire and generates the output based on this determination.

12. The system of claim 11, wherein the surrounding region identifier defines a size of the surrounding region based on a size of the core region.

13. The system of claim 11, wherein the surrounding region identifier defines a bounding box that includes all frame elements identified as part of the core region and defines the surrounding region as including the bounding box and a defined number of frame elements surrounding the periphery of the bounding box.

14. The system of claim 11, wherein the assignor associates a temporal feature having a frequency indicative of flame to the identified core region.

15. The system of claim 11, wherein the assignor associates a temporal feature having a frequency indicative of smoke to the identified core region.

16. A video recognition system comprising:
means for acquiring video data comprised of individual frames;
means for dividing each of the individual frames into a plurality of frame elements;
means for calculating a structural feature associated with each frame element;
means for identifying a core region of fire based on the calculated structural features;
means for defining a region surrounding the core region;
means for calculating a temporal feature associated with each frame element within the surrounding region;
means for associating the temporal features calculated with respect to frame elements within the surrounding region with the identified core region by assigning a representative temporal feature value to the core region; and
means for generating an output indicating whether the analyzed video data indicates the presence of fire based, at least in part, on the structural features and assigned temporal features associated with the identified core region.

17. The video recognition system of claim 16, wherein the means for identifying a core region includes:
means for identifying a core region of flame based on one or more structural features; and
means for identifying a core region of smoke based on one or more structural features.

18. The video recognition system of claim 16, wherein the means for associating a temporal feature calculated with respect to frame elements within the surrounding region includes association a temporal feature having a frequency indicating the presence of flame to the core region.

19. The video recognition system of claim 16, wherein the means for associating a temporal feature calculated with respect to frame elements within the surrounding region includes association a temporal feature having a frequency indicating the presence of smoke to the core region.

20. A non-transitory computer readable storage medium encoded with a machine-readable computer program code for generating a fire detection output, the computer readable storage medium including instructions for causing a controller to implement a method comprising:
acquiring video data comprised of individual frames;
dividing each of the individual frames into a plurality of frame elements;
calculating a structural feature associated with each frame element;
identifying a core region of fire based on the calculated structural features;
defining a region surrounding the core region;
calculating a temporal feature associated with each frame element within the surrounding region;
associating the temporal features calculated with respect to frame elements within the surrounding region with the identified core region by assigning a representative temporal feature value to the core region; and
generating an output indicating whether the analyzed video data indicates the presence of fire based, at least in part, on the structural features and assigned temporal features associated with the identified core region.

* * * * *